United States Patent
Lim et al.

(10) Patent No.: US 9,232,234 B2
(45) Date of Patent: Jan. 5, 2016

(54) VIDEO CODING DEVICE, VIDEO CODING METHOD THEREOF, VIDEO DECODING DEVICE, AND VIDEO DECODING METHOD THEREOF

(75) Inventors: Jeongyeon Lim, Seongnam-si (KR); Sunyeon Kim, Seoul (KR); Jaehoon Choi, Seongnam-si (KR); Gyumin Lee, Seongnam-si (KR); Yunglyul Lee, Seoul (KR); Jongki Han, Seoul (KR); Joohee Moon, Seoul (KR); Haekwang Kim, Seoul (KR); Byeungwoo Jeon, Seongnam-si (KR); Daeyeon Kim, Seoul (KR); Jeonghoon Seo, Seoul (KR); Kioh Kim, Anyang-si (KR); Sungwook Hong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 621 days.

(21) Appl. No.: 13/582,886

(22) PCT Filed: Mar. 4, 2011

(86) PCT No.: PCT/KR2011/001493
§ 371 (c)(1),
(2), (4) Date: Sep. 5, 2012

(87) PCT Pub. No.: WO2011/108879
PCT Pub. Date: Sep. 9, 2011

(65) Prior Publication Data
US 2012/0328014 A1    Dec. 27, 2012

(30) Foreign Application Priority Data

Mar. 5, 2010  (KR) .................. 10-2010-0019996

(51) Int. Cl.
| | |
|---|---|
| *H04N 19/103* | (2014.01) |
| *H04N 19/593* | (2014.01) |
| *H04N 19/61* | (2014.01) |
| *H04N 19/159* | (2014.01) |
| *H04N 19/176* | (2014.01) |
| *H04N 19/196* | (2014.01) |
| *H04N 19/11* | (2014.01) |

(52) U.S. Cl.
CPC ............. *H04N 19/593* (2014.11); *H04N 19/11* (2014.11); *H04N 19/159* (2014.11); *H04N 19/176* (2014.11); *H04N 19/196* (2014.11); *H04N 19/61* (2014.11)

(58) Field of Classification Search
CPC ...................................................... H04N 19/103
USPC ...................................................... 375/240.13
See application file for complete search history.

(56) References Cited

U.S. PATENT DOCUMENTS

2004/0233989 A1* 11/2004 Kobayashi ........... H04N 19/105
375/240.16

FOREIGN PATENT DOCUMENTS

| KR | 1020070027236 A | 3/2007 |
| KR | 10-0771641 | 10/2007 |

(Continued)

OTHER PUBLICATIONS

Korean Office Action dated Jan. 2, 2014.
(Continued)

*Primary Examiner* — Sath V Perungavoor
*Assistant Examiner* — Jeffery Williams
(74) *Attorney, Agent, or Firm* — Hauptman Ham, LLP

(57) ABSTRACT

The present disclosure provides a video encoding apparatus and method and a video decoding apparatus and method. The video encoding apparatus, includes: a block mode determiner for determining a block mode of a current block; an NCI block intra encoder responsive if the block mode of the current block determined by the block mode determiner is an intra mode and neighboring blocks of the current block include an NCI block, for encoding the NCI block through an intra prediction of the NCI block; and a current block intra encoder responsive if the block mode of the current block determined by the block mode determiner is the intra mode and the neighboring blocks of the current block include the NCI block, for encoding the current block through an intra prediction of the current block.

35 Claims, 9 Drawing Sheets

(56) References Cited

FOREIGN PATENT DOCUMENTS

| KR | 10-2008-0015830 | 2/2008 |
| KR | 10-2008-0068662 | 7/2008 |
| KR | 1020090087767 A | 8/2009 |

OTHER PUBLICATIONS

International Search Report mailed Nov. 1, 2011 for PCT/KR2011/001493.

\* cited by examiner

FIG. 5

(a) Vertical Bidirectional Prediction (b) Diagonal Bidirectional Prediction (c) Horizontal Bidirectional Prediction (d) Extended DC Prediction

VIDEO CODING DEVICE, VIDEO CODING METHOD THEREOF, VIDEO DECODING DEVICE, AND VIDEO DECODING METHOD THEREOF

CROSS REFERENCE TO RELATED APPLICATION

This application claims the priority of Korean Patent Application No. 10-2010-0019996, filed on Mar. 5, 2010 in the KIPO (Korean Intellectual Property Office). Further, this application is the National Phase application of International Application No. PCT/KR2011/001493 filed Mar. 4, 2011, which designates the United States and was published in Korean.

TECHNICAL FIELD

The present disclosure relates to a video encoding apparatus and method thereof and a video decoding apparatus and method thereof. More particularly, the present disclosure relates to a video encoding apparatus and method thereof and a video decoding apparatus and method thereof in which, when it is more effective to encode or decode a current block later rather than sooner, neighboring blocks are first encoded or decoded to increase adjacent pixels available for intra prediction in the subsequent encoding or decoding of the current block, whereby enabling the resultant predicted signal to be closer to the original signal and thus improving the compression efficiency and decoding efficiency.

BACKGROUND

The statements in this section merely provide background information related to the present disclosure and may not constitute prior art.

Moving Picture Experts Group (MPEG) and Video Coding Experts Group (VCEG) together stepped ahead of the existing MPEG-4 Part 2 and H.263 standard methods to develop a better and more excellent video compression technology. The new standard is called H.264/AVC (Advanced Video Coding) and was released simultaneously as MPEG-4 Part 10 AVC and ITU-T Recommendation H.264.

H.264/AVC (hereinafter referred to as 'H.264') uses a spatial predictive coding method, which is different from prior international video coding standards such as MPEG-1, MPEG-2, MPEG-4 Part2 Visual and the like. Conventional methods use "intra prediction" for coefficients transformed in Discrete Cosine Transform Domain (or DCT Transform Domain) to seek higher encoding efficiency resulting in degradation of the subjective video quality at low band transmission bit rates. However, H.264 adopts the method of encoding based on a spatial intra prediction in a spatial domain rather than in a transform domain.

In the aspect of the encoder to consider such encoding by the spatial intra prediction, information on the current block to be coded is predicted from information of an already encoded and reconstructed previous block, and encoding is performed only on the difference information between the outstanding actual block to be coded and the predicted block, and the encoded difference information is transmitted to a decoder. Then, the encoder may transmit parameters needed for prediction of the block to the decoder, or the encoder and decoder may be synchronized, so that they share the needed parameters for the decoder to predict the block. As for the decoder, the block information to be currently decoded is predicted by using already decoded and reconstructed adjacent block information and then added to the difference information transmitted from the encoder, which reconstructs the desired composition information. Then, again, if the parameters needed for the prediction are transmitted from the decoder, the corresponding parameters are decoded and used for prediction.

Intra predictions according to the H.264 standard are an intra_4×4 prediction, intra_8×8 prediction, intra_16×16 prediction, and the like, each including a plurality of prediction modes.

In the case of intra_4×4 prediction as shown in FIG. 1, the positions and predictive directivity of the adjacent pixels are considered to appoint nine prediction modes including a vertical mode (mode 0), horizontal mode (mode 1), direct current (DC) mode, diagonal down-left mode (mode 3), diagonal down-right mode (mode 4), vertical-right mode (mode 5), horizontal-down mode (mode 6), vertical-left mode (mode 7) and horizontal-up mode (mode 8).

In addition, in the case of intra_16×16 prediction as shown in FIG. 2, there are four prediction modes appointed including a vertical mode (mode 0), horizontal mode (mode 1), DC mode (mode 2) and plane mode (mode 3). The intra_8×8 prediction also has four modes similar to those of the intra_16×16 prediction.

Referring to FIGS. 1 and 2, the adjacent pixels for use in the prediction are limited to the pixels located at left and upper sides, because only the pixels reconstructed after the decoding can be used for the prediction. The encoder encodes blocks from the left to the right and from the upper side to the lower side according to the encoding order and sequentially transmits bitstreams resulting from compressing the blocks to the decoder. Therefore, reconstructed pixels exist at the left side and the upper side of the block to be currently encoded.

However, such a limitation of the pixels available for intra prediction to the left side and the upper side of the current block hinders an effective reduction of the spatial redundancy in the intra prediction mode, which is a primary cause of degrading the compression efficiency.

Further, the operation in unison between the inter prediction encoding and inter prediction decoding makes it difficult to expect an enhanced efficiency of the inter prediction decoding from the already deteriorated compression efficiency of the inter prediction encoding.

DISCLOSURE

Technical Problem

Therefore, to solve the above-mentioned problems, the present disclosure seeks to provide a video encoding apparatus and method thereof and a video decoding apparatus and method thereof in which, when it is more effective to encode or decode a current block later rather than sooner, neighboring blocks are first encoded or decoded to increase adjacent pixels available for intra prediction in the subsequent encoding or decoding of the current block, whereby enabling the resultant predicted signal to be closer to the original signal and thus improving the compression efficiency and decoding efficiency.

SUMMARY

An embodiment of the present disclosure provides a video encoding apparatus including: a block mode determiner for determining a block mode of a current block; an NCI (non-coded intra) block intra encoder responsive if the block mode of the current block is determined by the block mode determiner as an intra mode and neighboring blocks of the current block include an NCI block, for encoding the NCI block within the neighboring blocks through an intra prediction; and a current block intra encoder responsive if the block mode of the current block is determined by the block mode determiner as the intra mode and the neighboring blocks of the current block include the NCI block, for encoding the current block through an intra prediction.

The video encoding apparatus may further include an encoding skip unit responsive if the block mode of the current block determined by the block mode determiner as the intra mode and the neighboring blocks of the current block include no NCI block, for treating the current block as an NCI block and terminating the encoding of the current block.

The video encoding apparatus may further include: an inter encoder responsive if the block mode of the current block is determined by the block mode determiner as an inter mode, for encoding the current block through an inter prediction; and an NCI block extended intra encoder responsive if the neighboring blocks of the current block include the NCI block, for encoding the NCI block with the neighboring blocks through an extended intra prediction.

The NCI block extended intra encoder performs a uni-directional prediction, a bidirectional prediction, and an average (DC) value prediction by using already encoded pixels among neighboring blocks including upper, lower, left, right, and upper right blocks of the current block, and determines lowest cost one of the uni-directional prediction, bidirectional prediction, and average (DC) value prediction as a prediction mode.

Absence of the NCI block in the neighboring blocks of the current block may terminate the encoding of the current block.

The video encoding apparatus may further include a block type transmitter for encoding type information of the block mode determined by the block mode determiner into a bitstream and then transmitting the bitstream.

The block mode determiner may calculate cost of the block mode of the current block by using one or more of SAD (sum of absolute value) function, SATD (sum of absolute transformed difference) function, SSD (sum of squared difference) function, MAD (mean of absolute difference) function, and Lagrangian function.

The block mode determiner may calculate cost of each mode of the current block by using a cost function and determines a mode requiring least calculated cost as the block mode.

Another embodiment of the present disclosure provides a video encoding apparatus including: a block mode determiner for determining a block mode of a current block; an inter encoder responsive if the block mode of the current block is determined by the block mode determiner as an inter block mode, for reconstructing the current block based on a residual signal obtained through a motion prediction and a motion compensation of the current block; and an NCI block extended intra encoder responsive if neighboring blocks of the current block include an NCI block, for encoding the NCI block within the neighboring blocks through an extended intra prediction.

The NCI block extended intra encoder performs a uni-directional prediction, a bidirectional prediction, and an average (DC) value prediction by using already encoded pixels among neighboring blocks including upper, lower, left, right, and upper right blocks of the current block, and determines least cost one of the unidirectional prediction, bidirectional prediction and average value prediction as a prediction mode.

Another embodiment of the present disclosure provides a video decoding apparatus including: a block mode type determiner for decoding a block mode type of a current block from a bitstream which is received; an NCI block intra decoder responsive if the block mode type of the current block reconstructed by the block mode type determiner represents an intra mode and neighboring blocks of the current block include an NCI block, for decoding the NCI block within the neighboring blocks through an intra prediction; and a current block intra decoder for decoding the current block through an intra prediction.

The video decoding apparatus may further include a decoding skip unit responsive if the block mode type of the current block determined by the block mode type determiner represents an intra mode and the neighboring blocks of the current block include no NCI block, for treating the current block as an NCI block and terminating the decoding of the current block.

The video decoding apparatus may further include: an inter decoder responsive if the block mode type of the current block is determined by the block mode type determiner as an inter mode, for decoding the current block through an inter prediction; and an NCI block extended intra decoder responsive if the neighboring blocks of the current block include an NCI block, for decoding the NCI block within the neighboring blocks through an extended intra prediction.

The NCI block extended intra decoder receives residual coefficient information of the NCI block from the bitstream, and reconstructs the NCI block by performing one or more of a uni-directional prediction, a bidirectional prediction, and an average (DC) value prediction with respect to neighboring blocks including upper, lower, left, right, and upper right blocks of the current block by using the received residual coefficient information.

Absence of the NCI block in the neighboring blocks of the current block may terminate the decoding of the current block.

Another embodiment of the present disclosure provides a video decoding apparatus including: a block mode type determiner for decoding a block mode of a current block; an inter decoder responsive if a block mode type of the current block is reconstructed by the block mode type determiner to represent an inter mode, for reconstructing the current block based on a residual signal obtained through a motion prediction and a motion compensation of the current block; and an NCI block extended intra decoder responsive if neighboring blocks of the current block include an NCI block, for decoding the NCI block within the neighboring blocks through an extended intra prediction.

The NCI block extended intra decoder receives residual coefficient information of the NCI block, and reconstructs the NCI block by performing one or more of a uni-directional prediction, a bidirectional prediction, and an average (DC) value prediction for neighboring blocks including upper, lower, left, right, and upper right blocks of the current block by using the received residual coefficient information.

Another embodiment of the present disclosure provides a video encoding method including: determining a block mode of a current block; if the block mode of the current block is determined in the process of determining the block mode as an intra mode and neighboring blocks of the current block include an NCI block, encoding the NCI block within the neighboring blocks through an intra prediction; and encoding the current block through an intra prediction.

The video encoding method may further include, if the block mode of the current block is determined in the process of determining the block mode as an intra mode and the neighboring blocks of the current block include no NCI block, treating the current block as an NCI block and terminating the encoding of the current block.

The video encoding method may further include: if the block mode of the current block is determined in the process of determining the block mode as an inter mode, encoding the current block through an inter prediction; and if the neighboring blocks of the current block include an NCI block, encoding the NCI block within the neighboring blocks through an extended intra prediction of the NCI block.

The extended intra prediction is performed through a uni-directional prediction, a bidirectional prediction, and an average (DC) value prediction by using already encoded pixels among neighboring blocks including upper, lower, left, right, and upper right blocks of the current block, and lowest cost one of the uni-directional prediction, bidirectional prediction and average value prediction is determined as a prediction mode.

Absence of the NCI block in the neighboring blocks of the current block may terminate the encoding of the current block.

The video encoding method may further include encoding type information of the block mode determined in the process of determining the block mode into a bitstream and then transmitting the bitstream.

The process of determining the block mode may include calculating costs of block modes of the current block by using one or more of SAD (sum of absolute value) function, SATD (sum of absolute transformed difference) function, SSD (sum of squared difference) function, MAD (mean of absolute difference) function, and Lagrangian function, and determining a block mode requiring least calculated cost as the block mode.

Another embodiment of the present disclosure provides a video encoding method including: determining a block mode of a current block; encoding the current block through an intra prediction; and if the block mode of the current block is determined in the process of determining the block mode as an intra mode and neighboring blocks of the current block include an NCI block, encoding the NCI block through an intra prediction of the NCI block.

Another embodiment of the present disclosure provides a video encoding method including: determining a block mode of a current block; if the block mode of the current block is determined in the process of determining the block mode as an inter mode, reconstructing the current block based on a residual signal obtained through a motion prediction and a motion compensation of the current block; and if neighboring blocks of the current block include an NCI block, encoding the NCI block through an extended intra prediction of the NCI block.

The extended intra prediction is performed through a uni-directional prediction, a bidirectional prediction, and an average (DC) value prediction by using already encoded pixels among neighboring blocks including upper, lower, left, right, and upper right blocks of the current block, and lowest cost one of the uni-directional prediction, bidirectional prediction and average value prediction is determined as a prediction mode.

Another embodiment of the present disclosure provides a video decoding method including: decoding a block mode type of a current block from a received bitstream; if the block mode type of the current block is reconstructed by the process of decoding the block mode type to represent an intra mode and neighboring blocks of the current block include an NCI block, decoding the NCI block through an intra prediction of the NCI block; and decoding the current block through an intra prediction of the current block.

The video decoding method may further include, if the block mode type of the current block is reconstructed by the process of decoding the block mode type to represent an intra mode and the neighboring blocks of the current block include no NCI block, treating the current block as an NCI block and terminating the decoding of the current block.

The video decoding method may further include: if the block mode type of the current block is reconstructed by the process of decoding the block mode type to represent an inter mode, decoding the current block through an inter prediction of the current block; and if the neighboring blocks of the current block include an NCI block, decoding the NCI block within the neighboring blocks through performing an extended intra prediction of the NCI block.

The performing of the extended intra prediction includes: receiving residual coefficient information of the NCI block from the bitstream; and reconstructing the NCI block by performing one or more of a uni-directional prediction, a bidirectional prediction, and an average (DC) value prediction with respect to neighboring blocks including upper, lower, left, right, and upper right blocks of the current block by using the received residual coefficient information.

Absence of the NCI block in the neighboring blocks of the current block may terminate the decoding of the current block.

Another embodiment of the present disclosure provides a video decoding method including: decoding a block mode type of a current block from a received bitstream; decoding the current block through an intra prediction of the current block; and if the block mode type of the current block is reconstructed by the process of decoding the block mode type to represent an intra mode and neighboring blocks of the current block include an NCI block, decoding the NCI block within the neighboring blocks through an intra prediction of the NCI block.

Another embodiment of the present disclosure provides a video decoding method including: decoding a block mode of a current block; if the block mode type of the current block is reconstructed by the process of decoding the block mode to represent an inter mode, reconstructing the current block based on a residual signal obtained through a motion prediction and a motion compensation of the current block; and if neighboring blocks of the current block include an NCI block, decoding the NCI block through an extended intra prediction of the NCI block.

The performing of the extended intra prediction may include: receiving residual coefficient information of the NCI block from a bitstream which has been received; and reconstructing the NCI block by performing one or more of a uni-directional prediction, a bidirectional prediction, and an average (DC) value prediction with respect to neighboring blocks including upper, lower, left, right, and upper right blocks of the current block by using the received residual coefficient information.

Advantageous Effects

According to the present embodiment as described above, when it is more effective to encode or decode a current block later rather than sooner, neighboring blocks are first encoded or decoded to increase adjacent pixels available for intra prediction in the subsequent encoding or decoding of the current block, whereby enabling the resultant predicted signal to be closer to the original signal and thus improving the compression efficiency and decoding efficiency.

DESCRIPTION OF DRAWINGS

FIG. 5A illustrates pixels used for an intra 4×4 prediction, and FIGS. 5B, 5C, and 5D illustrate examples of pixels usable for an extended intra prediction according to the present disclosure, respectively;

DETAILED DESCRIPTION

Figure 1:
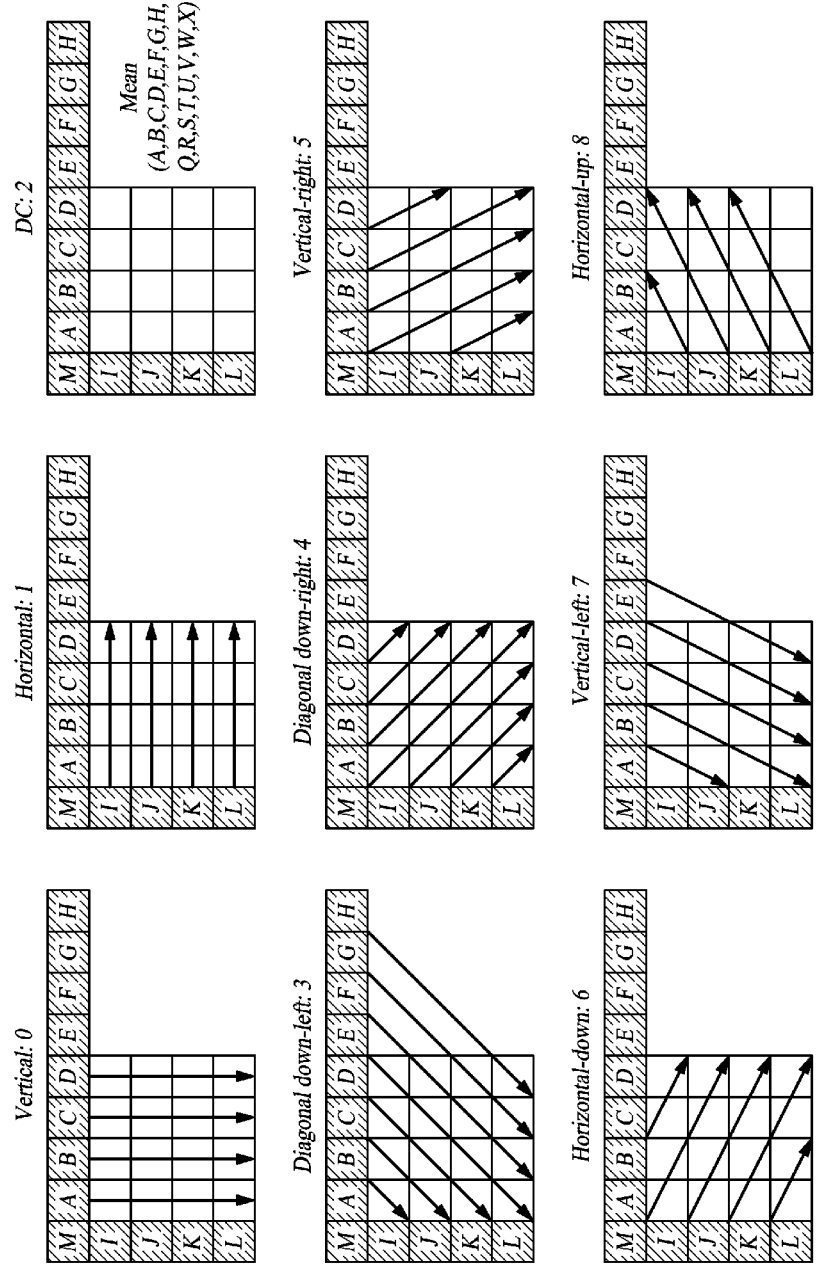
FIG. 1 illustrates conventional nine types of intra_4×4 prediction modes according to the H.264 standard.
Figure 2:
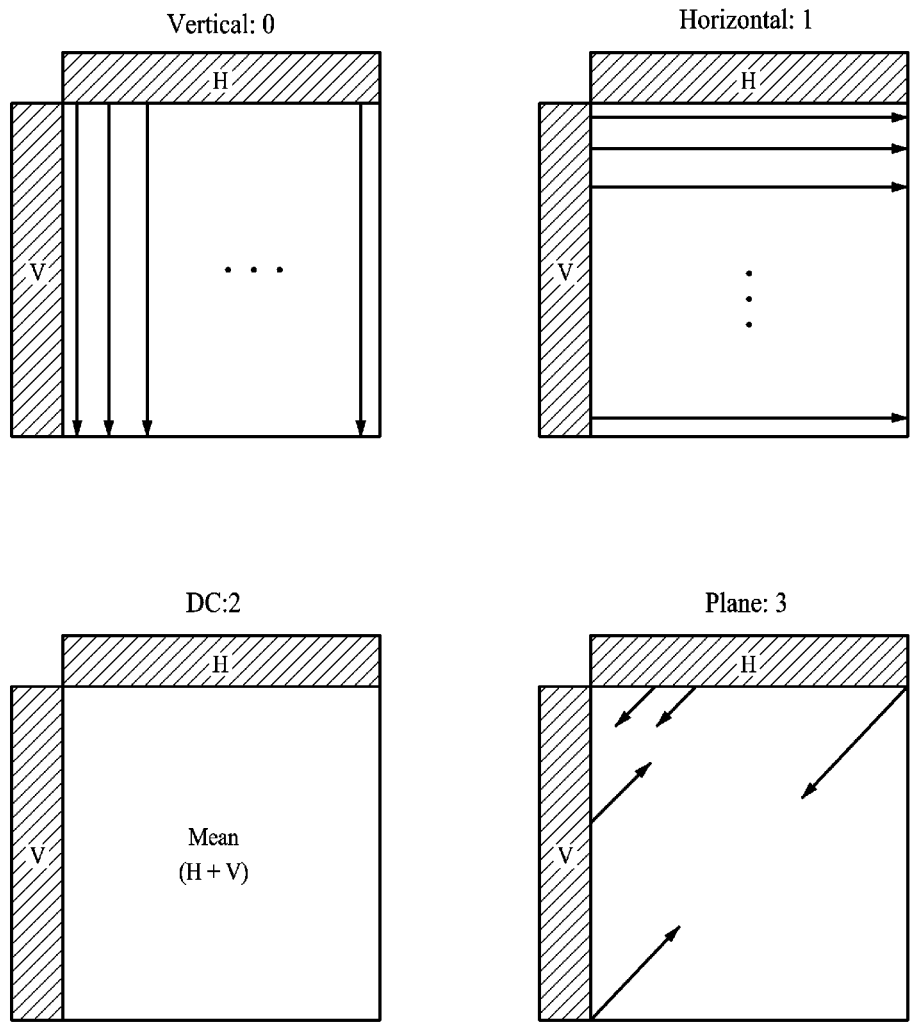
FIG. 2 illustrates conventional four types of intra_16×16 prediction modes according to the H.264 standard.

Hereinafter, embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Figure 3:
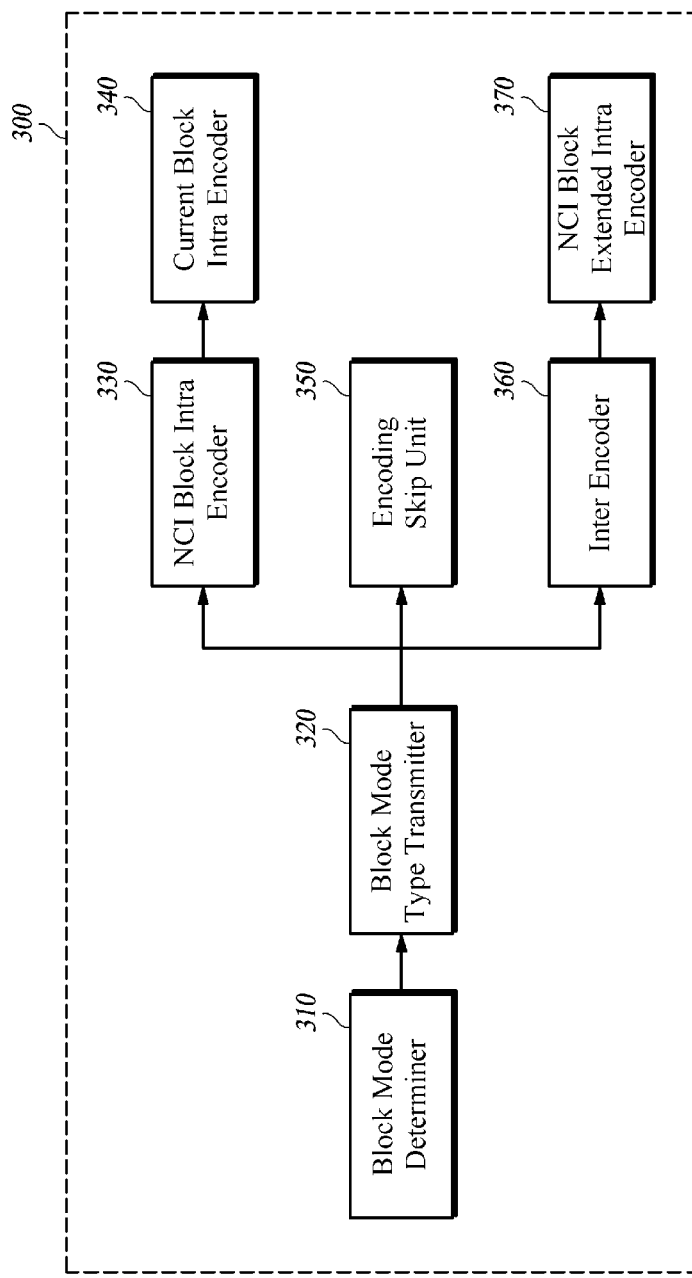
FIG. 3 is a block diagram roughly illustrating a video encoding apparatus according to an embodiment of the present disclosure.

FIG. 3 is a block diagram roughly illustrating a video encoding apparatus according to an embodiment of the present disclosure. Referring to FIG. 3, the video encoding apparatus 300 according to an embodiment of the present disclosure includes a block mode determiner 310, a block mode type transmitter 320, an NCI block intra encoder 330, a current block intra encoder 340, an encoding skip unit 350, an inter encoder 360, and an NCI block extended intra encoder 370.

The block mode determiner 310 determines a block mode for the current block. That is, the block mode determiner 310 determines a particular block mode selected from a plurality of candidate block modes as an optimum block mode by using a cost function, such as Rate-Distortion Optimization (RDO). In this event, the block mode determiner 310 may calculate the cost for each mode of the current block by using at least one function among SAD (sum of absolute value) function, SATD (sum of absolute transformed difference) function, SSD (sum of squared difference) function, MAD (mean of absolute difference) function, and Lagrangian function, and then determine a mode requiring the least calculated cost as the optimum block mode. Here, the SAD corresponds to the sum of absolute values of respective 4×4 block predicted differences (residual signals), and the SATD corresponds to the sum of absolute values of coefficients generated by applying Hadamard transform to the predicted differences (residual signals) of the respective 4×4 blocks. Further, the SSD corresponds to the sum of squares of the predicted differences (residual signals) of the respective 4×4 block predicted samples, and the MAD corresponds to the mean of absolute values of the predicted differences (residual signals) of the respective 4×4 block predicted samples. In addition, the Lagrangian Function refers to a cost function made by including length information of a bitstream into a Lagrangian constant.

The block mode type transmitter 320 encodes type information of a block mode determined by the block mode determiner 310 into a bitstream and then transmits the bitstream to a decoder 800 (see FIG. 8), which will be described later.

When the block mode of the current block determined by the block mode determiner 310 is an intra mode, the NCI block intra encoder 330 determines whether neighboring blocks of the current block include an NCI block. If so, the NCI block intra encoder 330 generates a residual signal for the NCI block existing in the neighboring blocks by using an intra prediction according to the conventional H.264 standard, encodes residual coefficient information into a bitstream through a transform and a quantization of the generated residual signal, transmits the bitstream to the decoder 800, and reconstructs the NCI block. The NCI block herein refers to a block with non-coded residual coefficient information.

Further, when the block mode of the current block determined by the block mode determiner 310 is intra mode, if the neighboring blocks of the current block include an NCI block, the current block intra encoder 340 generates a residual signal for the current block by using an intra prediction according to the conventional H.264 standard, encodes residual coefficient information into a bitstream through a transform and a quantization of the generated residual signal, transmits the bitstream to the decoder 800, and reconstructs the current block.

Although FIG. 3 shows that the current block intra encoder 340 performs the reconstruction of the current block after the operation of the NCI block intra encoder 330, the present invention is not limited to the construction shown in FIG. 3. Instead, the current block intra encoder 340 may perform the reconstruction of the current block either simultaneously with or prior to the operation of the NCI block intra encoder 330.

When the NCI block and the current block have been reconstructed by the NCI block intra encoder 330 and the current block intra encoder 340, the encoding of the current block is completed and the next block undergoes the encoding.

When the block mode of the current block determined by the block mode determiner 310 is intra mode, if the neighboring blocks of the current block include no NCI block, the encoding skip unit 350 treats the current block as an NCI block with non-coded residual coefficient information, terminates the encoding of the current block, and then shifts to the next block. In this event, although the residual coefficient information of the current block treated as the NCI block is not currently encoded, it may be encoded simultaneously when neighboring blocks are encoded in the future.

When the block mode of the current block determined by the block mode determiner 310 is an inter mode, the inter encoder 360 encodes residual coefficient information and motion vector information of the current block into a bitstream, transmits the bitstream to the decoder 800, and reconstructs the current block. Further, the inter encoder 360 determines whether the neighboring blocks of the current block include an NCI block.

When the neighboring blocks of the current block include an NCI block, the NCI block extended intra encoder 370 performs an extended intra prediction for the NCI block existing among the neighboring blocks of the current block, so as to achieve a prediction of pixels more similar to the original pixels. In this event, a block, which is treated as an NCI block without encoding its residual coefficient information since it is an intra-mode block and has no NCI block among its neighboring blocks, is encoded and reconstructed by an extended intra prediction when the block mode of the current block is an inter mode. That is, the NCI block extended intra encoder 370 generates pixels similar to the original pixels by using an interpolation filter, a bidirectional prediction, several directional predictions and using already reconstructed pixels of neighboring intra blocks and pixels of the current block reconstructed by the inter encoder 360. Further, the NCI block extended intra encoder 370 generates a residual signal by using pixels predicted through an extended intra prediction, encodes residual coefficient information into a bitstream through a transform and a quantization, transmits the bitstream to the decoder 800, and reconstructs the corresponding NCI block. When the NCI block has been reconstructed, the encoding of the current block is completed and the next block undergoes the encoding.

If the block mode of the current block is an inter block mode and the neighboring blocks include no NCI block, the inter encoder 360 performs an inter prediction of the current block, and then stops the encoding of the current block and shifts to the next block.

Figure 4:
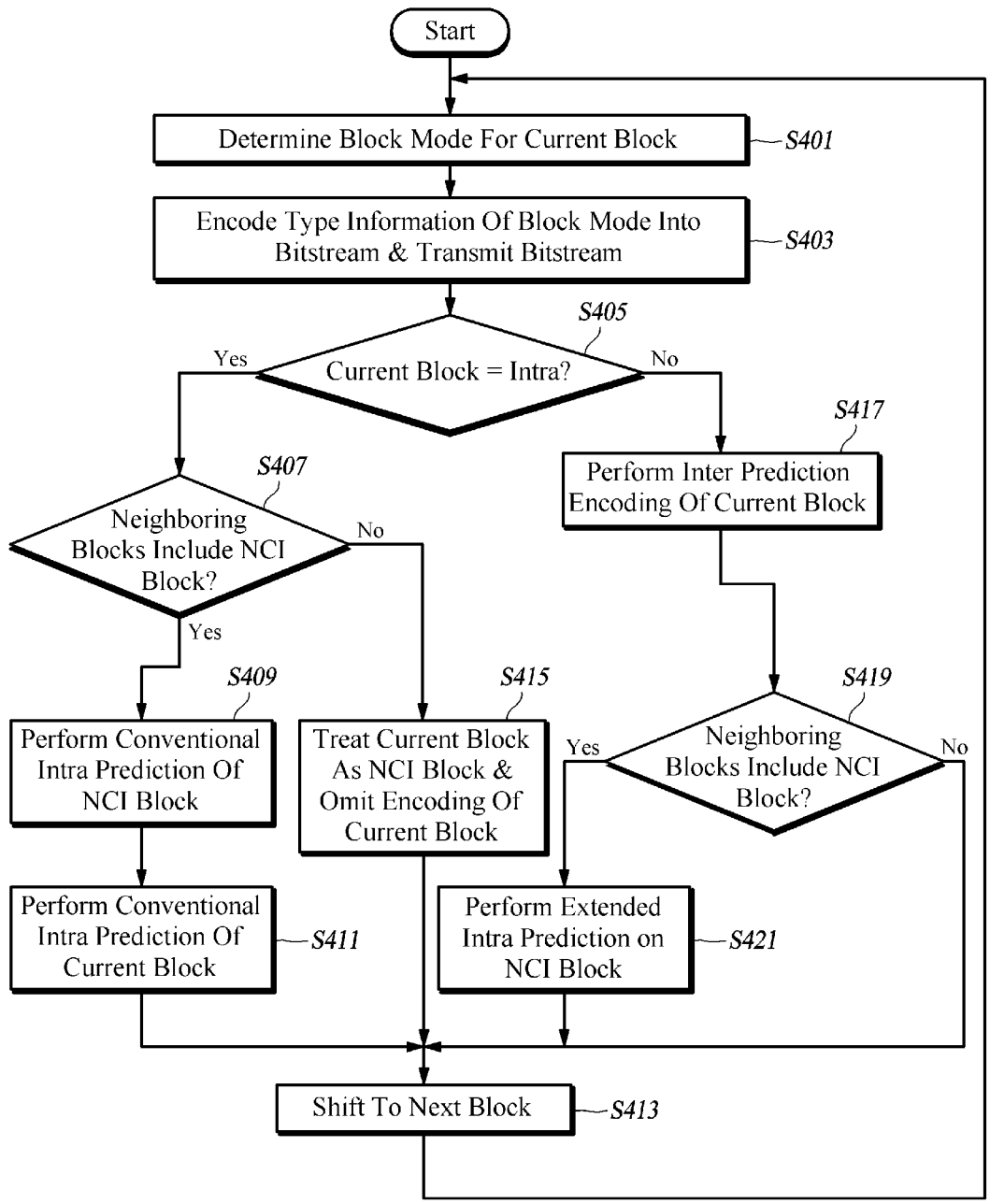
FIG. 4 is a flowchart illustrating an embodiment of a video encoding method by the video encoding apparatus shown in FIG. 3.

FIG. 4 is a flowchart illustrating an embodiment of a video encoding method by the video encoding apparatus shown in FIG. 3. Hereinafter, a construction and an operation of a video encoding apparatus according to an embodiment of the present disclosure will be described in detail with reference to FIG. 4.

The block mode determiner 310 determines a particular block mode selected from a plurality of candidate block modes as an optimum block mode by using a cost function, such as RDO (step S401). In this event, the block mode determiner may calculate the cost for each mode of the current block by using at least one function among SAD function, SATD function, SSD function, MAD function, and Lagrangian Function, and then determine a mode requiring the least calculated cost as the optimum block mode.

The block mode type transmitter 320 encodes only optimum block mode type information determined based on a cost function, such as RDO, by the block mode determiner 310 into a bitstream and then transmits the bitstream to a decoder 800 (step S403). In this event, the block mode type information transmitted to the decoder 800 by the block mode type transmitter 320 includes block size information and mode information indicating whether the block mode of the current block is an inter mode or an intra mode.

The NCI block intra encoder 330 determines the block mode of the current block determined by the block mode determiner 310 (step S405). When the block mode of the current block determined by the block mode determiner 310 is an intra mode, the NCI block intra encoder 330 determines whether neighboring blocks of the current block include an NCI block (step S407). If the neighboring blocks of the current block include an NCI block, the NCI block intra encoder 330 generates a residual signal for the NCI block existing in the neighboring blocks by using an intra prediction according to the conventional H.264 standard, encodes residual coefficient information into a bitstream through a transform and a quantization, transmits the bitstream to the decoder 800, and reconstructs the corresponding NCI block (step S409).

Further, when the block mode of the current block determined by the block mode determiner 310 is an intra mode, if the neighboring blocks of the current block include an NCI block, the current block intra encoder 340 generates a residual signal for the current block by using an intra prediction according to the conventional H.264 standard, encodes residual coefficient information into a bitstream through a transform and a quantization, transmits the bitstream to the decoder 800, and reconstructs the corresponding current block (step S411).

This embodiment performs an intra prediction on the NCI block within the neighboring blocks followed by intra predicting the current block considering that, when the block mode of the current block is an intra block mode and the neighboring blocks include an NCI block, there may be insufficient adjacent pixels available for the intra prediction of the current block since the residual coefficient of the NCI block has not been encoded up to date. Alternatively, the current block may be encoded before encoding the NCI block in the neighboring blocks. In this event, since the adjacent pixels used in the conventional intra prediction of the current block include an unusable pixel, the NCI block intra encoder 330 and the current block intra encoder 340 may use a modified intra prediction.

When the NCI block and the current block have been reconstructed by the NCI block intra encoder 330 and the current block intra encoder 340, the encoding of the corresponding current block is completed and the next block undergoes the encoding (step S413).

When the block mode of the current block determined by the block mode determiner 310 is an intra mode, if the neighboring blocks of the current block include no NCI block, the encoding skip unit 350 treats the current block as an NCI block with non-coded residual coefficient information (step S415), and then terminates the encoding of the current block and shifts to the next block (step S413). In this event, although the residual coefficient information of the current block treated as an NCI block is not currently encoded, it may be encoded simultaneously when neighboring blocks are encoded in the future. In other words, if the neighboring blocks to be encoded in the future are inter blocks, the NCI block still having non-encoded residual coefficient information may be encoded through an extended intra prediction. In contrast, if the neighboring blocks to be encoded in the future are determined as intra blocks, the NCI block having residual coefficient information that has not been encoded yet may be reconstructed by transmitting the residual coefficient information, up until the neighboring blocks are encoded.

As a result of the determination in step S405, when the block mode of the current block determined by the block mode determiner 310 is an inter mode, the inter encoder 360 compensates for motion by using motion vector information for the current block derived using a predetermined motion prediction method, obtains residual coefficient information by transforming and quantizing a residual signal corresponding to a difference between a block obtained by the motion compensation and the original image block, encodes the residual coefficient information into a bitstream, transmits the bitstream to the decoder 800, and reconstructs the current block (step S417). Thereafter, the inter encoder 360 determines whether the neighboring blocks of the current block include an NCI block (step S419).

When the neighboring blocks of the current block include an NCI block, the NCI block extended intra encoder 370 performs an extended intra prediction for the NCI block existing among the neighboring blocks of the current block, so as to achieve a prediction of pixels more similar to the original pixels (step S421). In this event, a block, which is treated as an NCI block without encoding its residual coefficient information since it is an intra-mode block and has no NCI block among its neighboring blocks as described above, is encoded and reconstructed by an extended intra prediction when the block mode of the current block is an inter mode. That is, the NCI block extended intra encoder 370 generates pixels similar to the original pixels by using the interpolation filter, bidirectional prediction, several directional predictions and using the already reconstructed pixels of neighboring intra blocks and pixels of the current block reconstructed by the inter encoder 360.

Figure 5:
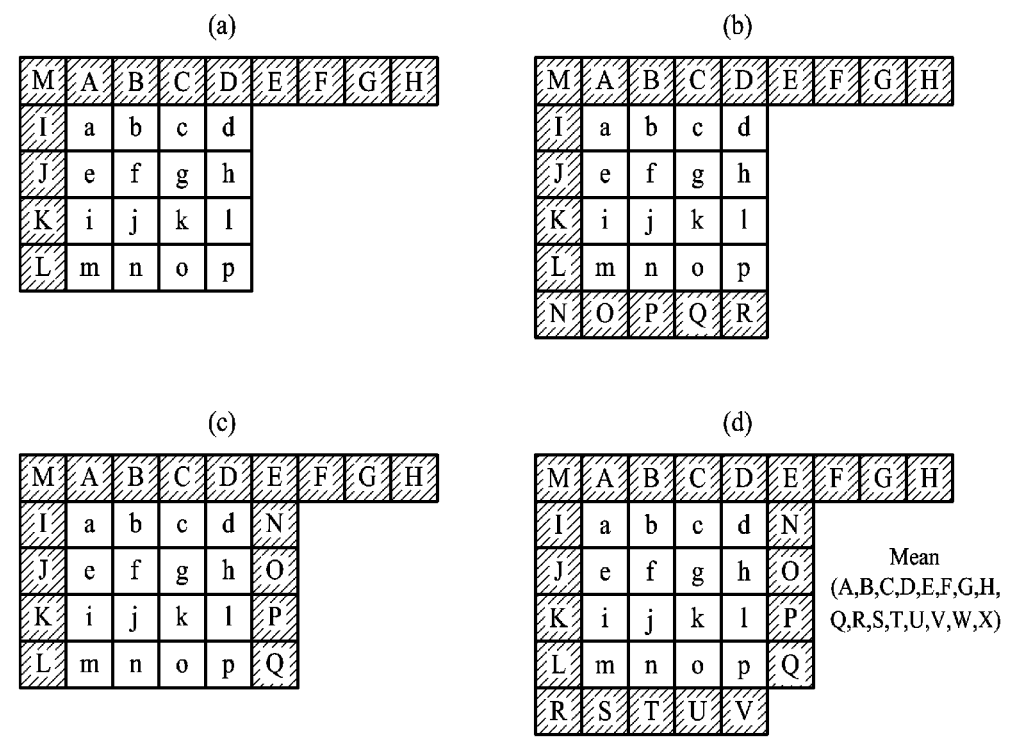

FIG. 5A illustrates pixels used for an intra 4×4 prediction, and FIGS. 5B, 5C, and 5D illustrate examples of pixels usable for an extended intra prediction according to the present disclosure, respectively. Hereinafter, an extended intra prediction according to an embodiment of the present disclosure will be described with reference to FIGS. 5A to 5D.

The pixels used in the intra 4×4 prediction of H.264 are divided into 16 pixels of the current block indicated by lowercase letters a to p and 13 pixels (adjacent pixels) of previously encoded neighboring blocks indicated by uppercase letters A to M as shown in FIG. 5A.

In an intra prediction for the current block shown in FIG. 5A using 9 prediction modes for H.264 intra 4×4 mode prediction, prediction of 9 directions are performed using the already encoded pixel values A to M, so as to achieve a compression in the optimum prediction direction. For example, in the prediction of the vertical mode (mode 0) shown in FIG. 1, pixels a, e, i, and m of the first column are predicted as shown in Equation 1 below.

$a'=a-A$ $e'=e-A$ $i'=i-A$ $m'=m-A$ Equation 1

Further, in the prediction of the diagonal down-left mode (mode 3) shown in FIG. 1, pixels a, e, i, and m of the first column are predicted as shown in Equation 2 below.

$a'=a-[(A+2B+C)/4]$ $e'=e-[(B+2C+D)/4]$ $i'=i-[(C+2D+E)/4]$ $m'=m-[(D+2E+F)/4]$ Equation 2

In the prediction of the other prediction modes also, the pixels are predicted using pixel values of already compressed adjacent pixels, so as to generate a residual signal.

FIG. 5B shows adjacent pixels usable for an extended intra prediction according to an embodiment of the present disclosure when not only left and upper blocks but also a lower block of the current block has already been encoded and reconstructed. The 18 pixels of uppercase letters A to R are pixels (adjacent pixels) of previously compressed neighboring blocks. With these pixels, a bidirectional prediction through an interpolation filter may be used as well as the conventional directional prediction.

FIG. 5C shows adjacent pixels usable for an extended intra prediction according to an embodiment of the present disclosure when a right block of the current block has already been encoded and reconstructed. The 17 pixels of uppercase letters A to Q are pixels (adjacent pixels) of previously compressed neighboring blocks. Using these pixels, the bidirectional prediction through interpolation filter may be used as well as the conventional directional prediction.

FIG. 5D shows adjacent pixels usable for an extended intra prediction according to an embodiment of the present disclosure when right and lower blocks of the current block have already been encoded and reconstructed. The 22 pixels of uppercase letters A to V are pixels (adjacent pixels) of previously compressed neighboring blocks. Using these pixels, the bidirectional prediction through interpolation filter may be used as well as the conventional directional prediction.

FIGS. 6A to 6D illustrate examples of bidirectional prediction and DC prediction usable in an extended intra prediction according to an embodiment of the present disclosure.

Figure 6:
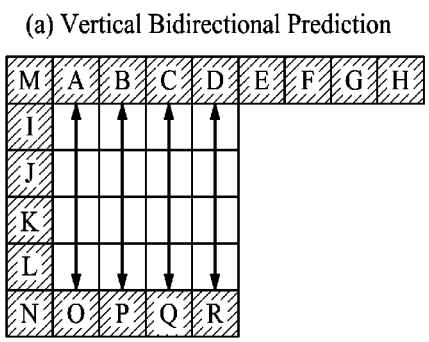
FIGS. 6A and 6B illustrate examples of an extended intra prediction executable according to the embodiments including bidirectional predictions and DC prediction.
Figure 6:
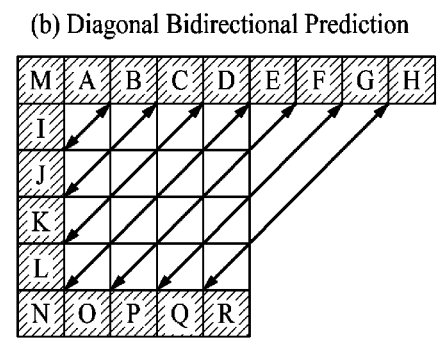
Figure 6:
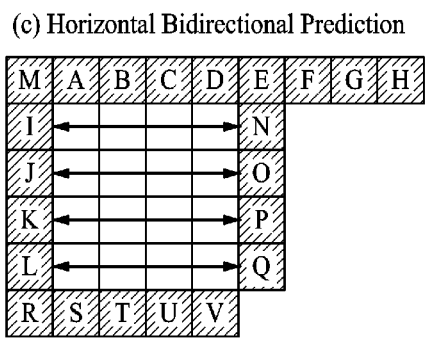
Figure 6:
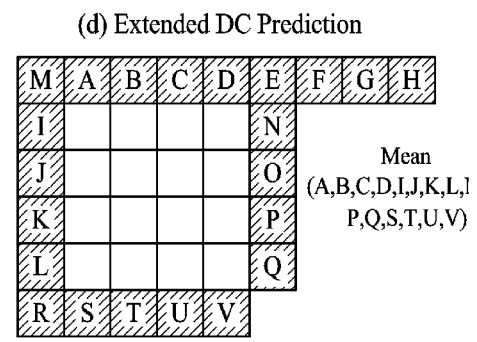

FIGS. 6A and 6B illustrate examples of an extended intra prediction executable according to the present disclosure when not only left and upper blocks but also a lower block of the current block has already been encoded and reconstructed. Referring to FIG. 6A showing a vertical bidirectional prediction of pixels a, e, i, and m of the first column of the current block shown in FIG. 5B, predicted values are obtained by Equation 3 below.

$a'=a-[(7A+O)/8]$ $e'=e-[(5A+3O)/8]$ $i'=i-[(3A+5O)/8]$ $m'=m-[(A+7O)/8]$ Equation 3

Further, in the diagonal bidirectional left or antidiagonal bidirectional prediction as shown in FIG. 6B, pixels a, b, c, and d of the first row of the current block can be predicted as shown in Equation 4 below.

$a'=a-[(A+2B+C)+(I+2J+K)]/8$ $e'=e-[(B+2C+D)+3\times(J+2K+L)]/16$ $i'=i-[(C+2D+E)+3\times(K°2L+N)]/16$ $m'=m-[(D+2E+F)+6\times(L+N)]/16$ Equation 4

Equations 3 and 4 correspond to only an example of an extended intra prediction according to an embodiment of the present disclosure, and various other prediction methods using various filter coefficients using reconstructed pixels of the lower side may be used.

FIG. 6C illustrates an example of an extended intra prediction executable according to the present disclosure when not only left and upper blocks but also a lower block of the current block has already been encoded and reconstructed. In this case also, pixels in both directions may be used to perform a horizontal bidirectional prediction in a way similar to Equation 3.

FIG. 6D illustrates an example of an extended intra prediction executable according to an embodiment when lower and right blocks of the current block have already been encoded and reconstructed. In this case, the pixels of the current block may be predicted by using a DC prediction using all adjacent pixels as well as the bidirectional prediction described above.

The predictions shown in FIGS. 6A to 6D represent examples of an extended intra prediction according to an embodiment only, and other methods including various bidirectional or uni-directional predictions may be used.

As described above, the NCI block extended intra encoder 370 performs an extended intra prediction such as a uni-directional prediction, a bidirectional prediction, and an average (DC) value prediction, by using already encoded pixels in the neighboring blocks including upper, lower, right, and right upper blocks of the current block, and determines a prediction mode requiring the least cost. In this event, a function of SAD, SATD, SSD, or MAD, or the Lagrangian function may be used as the cost function.

For predicting a certain pixel valued closest to the original pixel, the best way is to predict interposed pixels between the two pixels. However, due to the encoding order of blocks, the conventional intra prediction can use no more than upper and left adjacent pixels of the current block in predicting pixels within the current block. Therefore, the conventional intra prediction cannot use an interpolation filter, etc. and thus has a problem in generating an optimum prediction pixel. In this regard, according to an embodiment of the present disclosure, an encoding of residual coefficient information of an intra block is delayed, and the delayed encoding of the intra block (NCI block) is performed when encoding is finished along with reconstruction on the block located at the lower end of the intra block as an "inter" block. In this event, this NCI block can use all pixels of already encoded neighboring blocks as well as the upper and left blocks and thus allows generation of optimum predicted pixels by using an interpolation filter, etc. In this event, the several directional predictions may be carried out with not only the interpolation filter but also lower adjacent pixels and the average (DC) value prediction and bidirectional prediction may be carried out by using such blocks as the upper, lower, left, right, and upper right blocks of the current block to generate a predicted pixel which is more similar to the original pixel. By using the predicted pixel generated in this way, a residual signal between the original signal and the predicted signal is generated and is then subjected to a transform and a quantization so as to generate residual coefficient information, which is then transmitted to the decoder 800. Then, this block is not an NCI block any longer since the residual coefficient information has been transmitted. Further, since this block has been reconstructed and encoded, the next block is subjected to the encoding.

If the block mode of the current block is an inter block mode and neighboring blocks of the current block include no NCI block, the inter encoder 360 performs an inter prediction of the current block, terminates the encoding of the current block, and then shifts to the next block.

Figure 7:
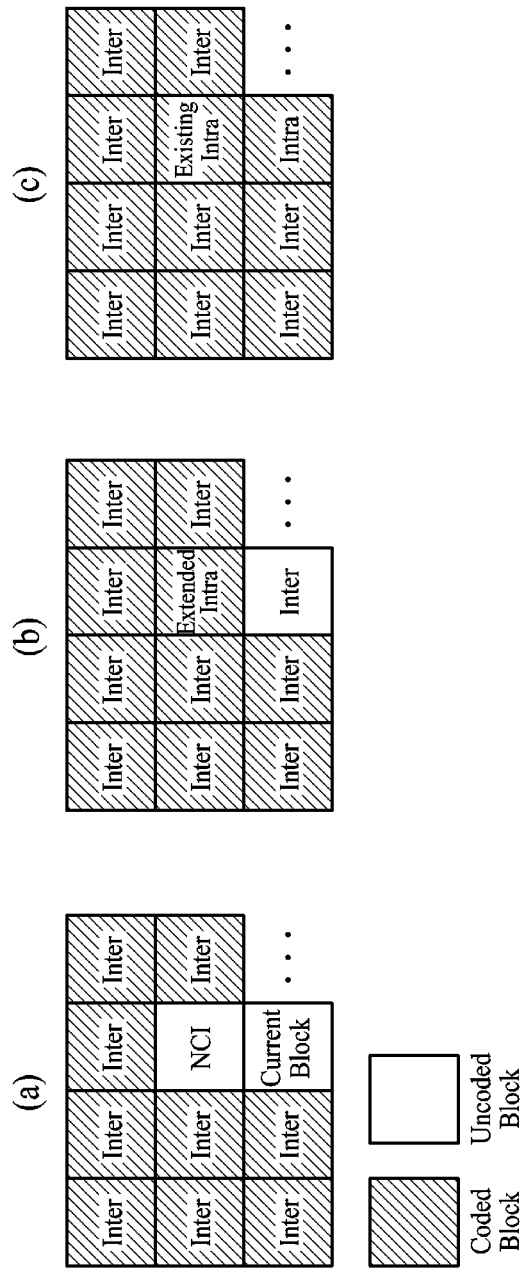
FIG. 7A illustrates that the upper block among the neighboring blocks of the current block is an NCI block.
FIG. 7B illustrates an even that an extended intra prediction has been performed for the NCI block at the upper side of the current block when the current block is of inter mode.
FIG. 7C illustrates an event that a conventional intra prediction has been performed for the NCI block at the upper side of the current block when the current block is of intra mode.

FIGS. 7A to 7C illustrate examples of blocks for employing an extended intra prediction using right and lower blocks according to an embodiment of the present disclosure.

FIG. 7A shows an example in which the upper block among the neighboring blocks of the current block is an NCI block. In the example shown in FIG. 7A, the NCI block at the upper side of the current block has not been reconstructed yet, since only the mode information of the NCI block has been encoded but the residual coefficient information thereof has not been encoded yet. In this event, as the current block is encoded as an intra or inter block, the NCI block of the upper side is encoded by extended intra methods or the conventional intra methods.

FIG. 7B shows an example in which an extended intra prediction has been performed for the NCI block at the upper side of the current block when the current block is of an inter mode. As shown in FIG. 7B, when the current block has been encoded as the inter block, the NCI block at the upper side of the current block may use an extended intra prediction with all the adjacent pixels as shown in FIG. 6D.

FIG. 7C shows an example in which a conventional intra prediction has been performed for the NCI block at the upper side of the current block when the current block is of an intra mode. As shown in FIG. 7C, when the current block has been determined as the intra mode, the NCI block at the upper side may be encoded earlier than the current block by using the existing method of intra prediction, and thereby residual coefficient information is transmitted to the decoder 800 and where it is reconstructed. Then, the current block may undergo the existing intra prediction by using the reconstructed pixels at the upper side thereof.

Figure 8:
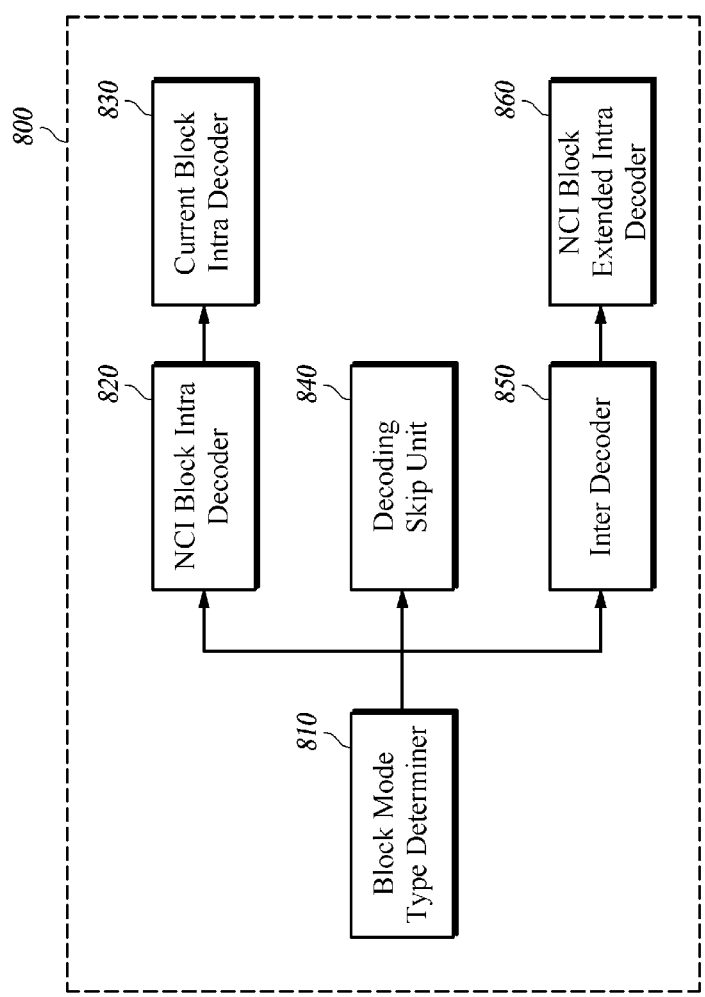
FIG. 8 is a block diagram roughly illustrating a video decoding apparatus according to an embodiment of the present disclosure.

FIG. 8 is a block diagram roughly illustrating a video decoding apparatus according to an embodiment of the present disclosure. Referring to FIG. 8, the video decoding apparatus 800 according to the embodiment of the present disclosure includes a block mode type determiner 810, an NCI block intra decoder 820, a current block intra decoder 830, a decoding skip unit 840, an inter decoder 850, and an NCI block extended intra decoder 860.

The block mode type determiner 810 receives a bitstream from the video encoding apparatus 300, extracts block mode type information of the current block from the received bitstream, decodes the extracted block mode type information, and determines whether the current block is an intra-mode block or an inter-mode block.

When the block mode of the current block determined by the block mode type determiner 810 is an intra mode, the NCI block intra decoder 820 determines whether neighboring blocks of the current block include an NCI block. If so, the NCI block intra decoder 820 decodes residual coefficient information from the received bitstream, generates a residual signal through a de-quantization and an inverse transform, and reconstructs the NCI block through an intra prediction according to the conventional H.264 standard.

Further, when the block mode of the current block determined by the block mode type determiner 810 is an intra mode, if the neighboring blocks of the current block include an NCI block, the current block intra decoder 830 decodes residual coefficient information of the current block from the received bitstream, generates a residual signal through a de-quantization and an inverse transform, and reconstructs the current block by using an intra prediction according to the conventional H.264 standard.

FIG. 8 shows that the current block intra decoder 830 performs the reconstruction of the current block after the NCI block is reconstructed by the NCI block intra decoder 820, which is not limited to this sequence of operation. Instead, the current block intra decoder 830 may perform the reconstruction of the current block either simultaneously with or prior to the operation of the NCI block intra decoder 820.

When the NCI block and the current block have been reconstructed by the NCI block intra decoder 820 and the current block intra decoder 830, the decoding of the current block is completed and the next block undergoes the decoding.

When the block mode of the current block determined by the block mode type determiner 810 is an intra mode, if the neighboring blocks of the current block include no NCI block, the decoding skip unit 840 treats the current block as an NCI block for which residual coefficient information is not transmitted, terminates the decoding of the current block, and then shifts to the next block. In this event, although the current block treated as an NCI block does not have its residual coefficient information currently decoded, the information may be decoded simultaneously when the neighboring blocks are decoded in the future.

When the block mode of the current block determined by the block mode type determiner 810 is an inter mode, the inter decoder 850 decodes residual coefficient information and motion vector information from the received bitstream, and reconstructs the current block through a motion compensation, and processes of a de-quantization and an inverse transform of residual coefficients. Further, the inter decoder 850 determines whether the neighboring blocks of the current block include an NCI block.

When the neighboring blocks of the current block include an NCI block, the NCI block extended intra decoder 860 receives residual coefficient information of the corresponding NCI block from the bitstream, and generates a residual signal for the NCI block through a de-quantization and an inverse transform by using the received residual coefficient information. Further, the NCI block extended intra decoder 860 performs an extended intra prediction according to an embodiment of the present disclosure, so as to achieve a prediction of pixels more similar to the original pixels. In this event, a block, which is treated as an NCI block without being decoded since it is an intra-mode block and has no NCI block among its neighboring blocks, is decoded through the extended intra prediction when the block mode of the current block is an inter mode. That is, the NCI block extended intra decoder 860 generates pixels similar to the original pixels by using the interpolation filter, bidirectional prediction, several directional predictions and using the already reconstructed pixels of neighboring intra blocks and pixels of the current block reconstructed by the inter decoder 850. Further, the NCI block extended intra decoder 860 reconstructs the NCI block by adding the residual signal of the NCI block and the pixel values of the generated pixels, completes the decoding of the current block, and then shifts to the next block.

If the block mode of the current block is an inter block mode and the neighboring blocks do not include an NCI block, the inter decoder 850 performs an inter prediction of the current block, and then completes the decoding of the current block and shifts to the next block.

Figure 9:
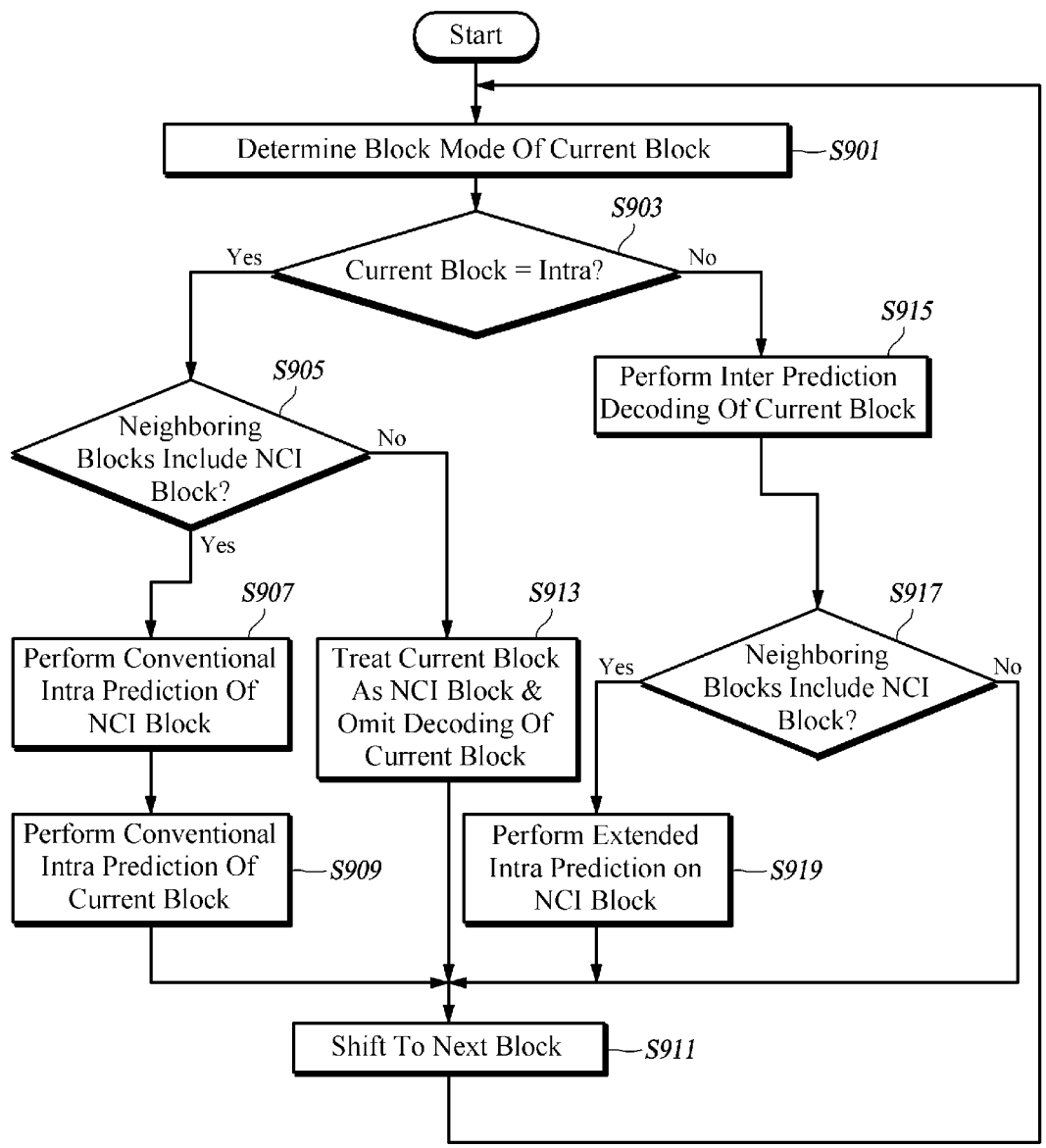
FIG. 9 is a flowchart illustrating an embodiment of a video decoding method by the video decoding apparatus shown in FIG. 8.

FIG. 9 is a flowchart illustrating an embodiment of a video decoding method by the video decoding apparatus shown in FIG. 8. Hereinafter, a construction and an operation of a video decoding apparatus according to an embodiment of the present disclosure will be described in detail with reference to FIG. 9.

The block mode type determiner 810 receives a bitstream from the video encoding apparatus 300, extracts block mode type information of the current block from the received bitstream, decodes the extracted block mode type information, and determines whether the current block is an intra-mode block or an inter-mode block (step S901). As described above, the received bitstream includes information on whether the current block is an intra-mode block or an inter-mode block, and information on the size of the block.

If the block mode type determiner 810 determines the block mode of the current block as an intra mode (step S903), the NCI block intra decoder 820 determines whether neighboring blocks of the current block include an NCI block (step S905). If so, the NCI block intra decoder 820 decodes residual coefficient information from the received bitstream, generates a residual signal through a de-quantization and an inverse transform, and reconstructs the NCI block through an intra prediction according to the conventional H.264 standard (step S907).

Further, when the block mode of the current block determined by the block mode type determiner 810 is the intra mode, if the neighboring blocks of the current block include an NCI block, the current block intra decoder 830 decodes residual coefficient information of the current block from the received bitstream, generates a residual signal through a de-quantization and an inverse transform, and reconstructs the current block by using an intra prediction according to the conventional H.264 standard (step S909).

Alternatively, the current block may be first decoded before decoding the NCI block in the neighboring blocks. In this event, since the adjacent pixels used in the conventional intra prediction of the current block include an unusable pixel, the NCI block intra decoder 820 and the current block intra decoder 830 may use a modified intra prediction.

When the NCI block and the current block have been reconstructed by the NCI block intra decoder 820 and the current block intra decoder 830, the decoding of the current block is completed and the next block undergoes the decoding routine (step S911).

When intra is the mode of the current block as determined by the block mode type determiner 810 with no NCI block existing in the neighboring blocks of the current block, the decoding skip unit 840 treats the current block as an NCI block for which residual coefficient information is not transmitted, and then terminates the decoding of the current block and shifts to the next block (step S913). In this event, although the residual coefficient information of the current block treated as an NCI block is not currently decoded, it may be decoded simultaneously when the neighboring blocks are decoded in the future. In other words, if the neighboring blocks to be decoded in the future are inter blocks, the NCI block still having non-decoded residual coefficient information may be decoded through the extended intra prediction. In contrast, if the neighboring blocks to be decoded in the future are determined as intra blocks, the NCI block having residual coefficient information that has not been decoded yet may be reconstructed through the conventional intra prediction up until the neighboring blocks are decoded.

When the block mode of the current block determined by the block mode type determiner 810 is an inter mode, the inter decoder 850 decodes motion vector information from the bitstream and then performs a motion compensation. Further, the inter decoder 850 decodes residual coefficient information of the current block from the bitstream, generates a residual signal through a de-quantization and an inverse transform, and adds the residual signal and a motion compensated block, so as to reconstruct the current block (step S915). Thereafter, the inter decoder 850 determines whether the neighboring blocks of the current block include an NCI block (step S917).

When the neighboring blocks of the current block include an NCI block, the NCI block extended intra decoder 860 performs an extended intra prediction for the NCI block existing among the neighboring blocks of the current block, so as to reconstruct the NCI block (step S919). To this end, the NCI block extended intra decoder 860 receives residual coefficient information for the NCI block from the bitstream and generates a residual signal through a de-quantization and an inverse transform. Further, the NCI block extended intra decoder 860 performs an extended intra prediction for the NCI block to predict a pixel value. In this event, the extended intra prediction performed by the NCI block extended intra decoder 860 is equal to the extended intra prediction executed by the NCI block extended intra encoder 370 in FIG. 3, so a detailed description thereof is omitted here.

The NCI block extended intra decoder 860 reconstructs the NCI block by adding the residual signal and a predicted pixel generated through the extended intra prediction, and then completes the decoding of the current block and shifts to the next block.

If the block mode of the current block is an inter block mode and the neighboring blocks of the current block do not include an NCI block, the inter decoder 850 reconstructs the current block by performing an inter prediction of the current block, and then completes the decoding of the current block and shifts to the next block.

In the description above, although the encoder and decoder for the motion vectors are separately implemented as independent units, they may be implemented within a single video encoding/decoding apparatus, which is capable of not only encoding an image signal and then transmitting the encoded image to another image processing apparatus but also receiving an encoded bitstream from another video processing apparatus, reconstructing an image signal from the received bitstream, and then reproducing the reconstructed image signal.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. The computer readable media may include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is highly useful for application in the fields in which, when it is more effective to encode or decode a current block later rather than sooner, neighboring blocks are first encoded or decoded to increase adjacent pixels available for intra prediction in the subsequent encoding or decoding of the current block, whereby enabling the resultant predicted signal to be closer to the original signal and thus improving the compression efficiency and decoding efficiency.

The invention claimed is:

1. A video encoding apparatus, comprising:
   a block mode determiner configured to determine a block mode of a current block to be encoded, the block mode of the current block being determined as one of prediction modes including an inter mode and an intra mode;
   a non-coded intra (NCI) block intra encoder configured to encode an NCI block located at a first position adjacent to the current block, when the block mode of the current block is the intra mode; and
   a current block intra encoder configured to encode the current block by performing an intra prediction after the NCI block located at the first position adjacent to the current block is encoded, when the block mode of the current block is the intra mode.

2. The video encoding apparatus of claim 1, further comprising
   an encoding skip unit configured to set the current block as an NCI block, when the block mode of the current block is the intra mode and there is not a previous NCI block located at a second position adjacent to the current block.

3. The video encoding apparatus of claim 1, further comprising:
   an inter encoder configured to encode the current block by using an inter prediction, when the block mode of the current block is the inter mode; and
   an NCI block extended intra encoder configured to encode an NCI block located at a third position adjacent to the current block by using an extended intra prediction after the current block is encoded, when the block mode of the current block is the inter mode,
   wherein the extended intra prediction for the NCI block located at the third position adjacent to the current block is performed by using one or more encoded pixel values of the current block.

4. The video encoding apparatus of claim 3, wherein a candidate prediction direction for the extended intra prediction of the NCI block located at the third position includes at least one of a horizontal left direction or a vertical upward direction.

5. The video encoding apparatus of claim 3, wherein a candidate prediction direction for the extended intra prediction of the NCI block located at the third position includes at least one of a horizontal bi-direction or a vertical bi-direction.

6. The video encoding apparatus of claim 1, further comprising a block type transmitter configured to encode the block mode of the current block into a bitstream.

7. The video encoding apparatus of claim 1, wherein the first position is at least one of a left side of the current block or an upper side of the current block.

8. The video encoding apparatus of claim 1, wherein the first position is determined regardless of an intra prediction mode of the current block for performing an intra prediction of the current block.

9. A video encoding apparatus, comprising:
a block mode determiner configured to determine a block mode of a current block to be encoded, the block mode of the current block being determined as one of prediction modes including an inter mode and an intra mode;
a current block intra encoder configured to encode the current block by performing an intra prediction, when the block mode of the current block is the intra mode; and
a non-coded intra (NCI) block intra encoder configured to encode an NCI block located at a first position adjacent to the current block after the current block is encoded, when the block mode of the current block is the intra mode.

10. The video encoding apparatus of claim 9, wherein further comprising
a block type transmitter configured to encode the block mode of the current block into a bitstream.

11. A video decoding apparatus comprising:
a block mode type determiner configured to decode a bitstream and thereby determine a block mode type of a current block, the block mode of the current block being determined as one of prediction modes including an inter mode and an intra mode;
a non-coded intra (NCI) block intra decoder configured to decode an NCI block located at a first position adjacent to the current block, when the block mode of the current block is the intra mode; and
a current block intra decoder configured to decode the current block by performing an intra prediction after the NCI block located at the first position adjacent to the current block is decoded, when the block mode of the current block is the intra mode.

12. The video decoding apparatus of claim 11, further comprising a decoding skip unit configured to set the current block as an NCI block, when the block mode of the current block is the intra mode and there is not a previous NCI block located at a second position adjacent to the current block.

13. The video decoding apparatus of claim 11, further comprising:
an inter decoder configured to decode the current block by using an inter prediction, when the block mode of the current block is the inter mode; and
an NCI block extended intra decoder configured to decode an NCI block located at a third position adjacent to the current block by using an extended intra prediction after the current block is decoded, when the block mode of the current block is the inter mode,
wherein the extended intra prediction for the NCI block located at the third position adjacent to the current block is performed by using one or more decoded pixel values of the current block.

14. The video decoding apparatus of claim 13, wherein a candidate prediction direction for the extended intra prediction of the NCI block located at the third position includes at least one of a horizontal left direction or a vertical upward direction.

15. The video decoding apparatus of claim 13, wherein the first position is at least one of a left side of the current block or an upper side of the current block.

16. A video decoding apparatus, comprising:
a block mode type determiner configured to decode a bitstream and thereby determine a block mode of a current block, the block mode of the current block being determined as one of prediction modes including an inter mode and an intra mode;
a current block intra decoder configured to decode the current block by performing an intra prediction, when the block mode of the current block is the intra mode; and
a non-coded intra (NCI) block intra decoder configured to decode an NCI block located at a first position adjacent to the current block after the current block is decoded, when the block mode of the current block is the intra mode.

17. The video decoding apparatus of claim 16, wherein further comprising a decoding skip unit configured to set the current block as an NCI block, when the block mode of the current block is the intra mode and there is not a previous NCI block located at a second position adjacent to the current block.

18. A video encoding method, comprising:
determining a block mode of a current block to be encoded, the block mode of the current block being determined as one of prediction modes including an inter mode and an intra mode;
encoding a non-coded intra (NCI) block located at a first position adjacent to the current block, when the block mode of the current block is the intra mode; and
encoding the current block by performing an intra prediction after the NCI block located at the first position adjacent to the current block is encoded, when the block mode of the current block is the intra mode.

19. The video encoding method of claim 18, further comprising
setting the current block as an NCI block, when the block mode of the current block is the intra mode and there is not a previous NCI block located at a second position adjacent to the current block.

20. The video encoding method of claim 18, further comprising:
encoding the current block by using an inter prediction, when the block mode of the current block is the inter mode; and
encoding an NCI block located at a third position adjacent to the current block by using an extended intra prediction after the current block is encoded, when the block mode of the current block is the inter mode,
wherein the extended intra prediction for the NCI block located at the third position adjacent to the current block is performed by using one or more encoded pixel values of the current block.

21. The video encoding method of claim 20, wherein a candidate prediction direction for the extended intra prediction of the NCI block located at the third position includes at least one of a horizontal left direction or a vertical upward direction.

22. The video encoding method of claim 20, wherein a non-coded intra (NCI) block intra encoder configured to encode an NCI block located at a first position adjacent to the current block, when the block mode of the current block is the intra mode.

23. The video encoding method of claim 18, further comprising encoding the block mode of the current block into a bitstream.

24. The video encoding method of claim 18, wherein the first position is at least one of a left side of the current block or an upper side of the current block.

25. A video encoding method, comprising:
- determining a block mode of a current block to be encoded, the block mode of the current block being determined as one of prediction modes including an inter mode and an intra mode;
- encoding the current block by performing an intra prediction, when the block mode of the current block is the intra mode; and
- encoding a non-coded intra (NCI) block located at a first position adjacent to the current block after the current block is encoded, when the block mode of the current block is the intra mode.

26. The video encoding method of claim 25, further comprising:
- encoding the current block by using an inter prediction, when the block mode of the current block is the inter mode; and
- encoding an NCI block located at a third position adjacent to the current block by using an extended intra prediction after the current block is encoded, when the block mode of the current block is the inter mode.

27. The video encoding method of claim 25, further comprising: encoding the block mode of the current block into a bitstream.

28. A video decoding method, comprising:
- decoding a bitstream and thereby determining a block mode type of a current block, the block mode of the current block being determined as one of prediction modes including an inter mode and an intra mode;
- decoding a non-coded intra (NCI) block located at a first position adjacent to the current block, when the block mode of the current block is the intra mode; and
- decoding the current block by performing an intra prediction after the NCI block located at the first position adjacent to the current block is decoded, when the block mode of the current block is the intra mode.

29. The video decoding method of claim 28, further comprising
- setting the current block as an NCI block, when the block mode of the current block is the intra mode and there is not a previous NCI block located at a second position adjacent to the current block.

30. The video decoding method of claim 28, further comprising:
- decoding the current block by using an inter prediction, when the block mode of the current block is the inter mode; and
- decoding an NCI block located at a third position adjacent to the current block by using an extended intra prediction after the current block is decoded, when the block mode of the current block is the inter mode,
- wherein the extended intra prediction for the NCI block located at the third position adjacent to the current block is performed by using one or more decoded pixel values of the current block.

31. The video decoding method of claim 30, wherein a candidate prediction direction for the extended intra prediction of the NCI block located at the third position includes at least one of a horizontal left direction or a vertical upward direction.

32. The video decoding method of claim 30, wherein the first position is at least one of a left side of the current block or an upper side of the current block.

33. A video decoding method, comprising:
- decoding a bitstream and thereby determining a block mode of a current block, the block mode of the current block being determined as one of prediction modes including an inter mode and an intra mode;
- decoding the current block by performing an intra prediction, when the block mode of the current block is the intra mode; and
- decoding a non-coded intra (NCI) block located at a first position adjacent to the current block after the current block is decoded, when the block mode of the current block is the intra mode.

34. The video decoding method of claim 33, comprising:
- decoding the current block by using an inter prediction, when the block mode of the current block is the inter mode; and decode an NCI block located at a third position adjacent to the current block by using an extended intra prediction after the current block is decoded, when the block mode of the current block is the inter mode,
- wherein the extended intra prediction for the NCI block located at the third position adjacent to the current block is performed by using one or more decoded pixel values of the current block.

35. The video decoding method of claim 34, further comprising: setting the current block as an NCI block, when the block mode of the current block is the intra mode and there is not a previous NCI block located at a second position adjacent to the current block.

\* \* \* \* \*